March 10, 1953 — M. MARON — 2,631,260
COMPENSATING AMPLIFIER FOR CATHODE-RAY TUBES
Filed Sept. 23, 1950
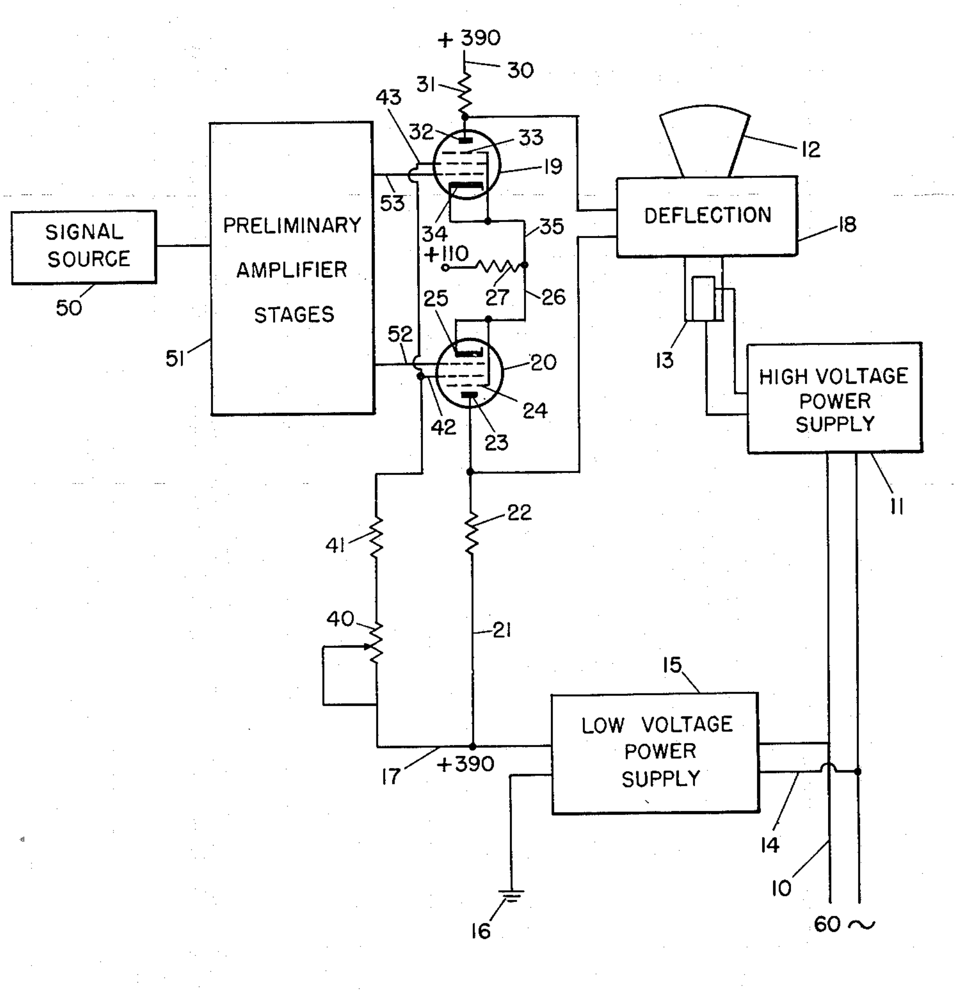
INVENTOR.
MEYER MARON
BY Darby & Darby
ATTORNEYS Patented Mar. 10, 1953 2,631,260

UNITED STATES PATENT OFFICE 2,631,260

COMPENSATING AMPLIFIER FOR CATHODE-RAY TUBES

Meyer Maron, Passaic, N. J., assignor to Allen B. Du Mont Laboratories, Inc., Clifton, N. J., a corporation of Delaware Application September 23, 1950, Serial No. 186,471

1 Claim. (Cl. 315—26)

This invention relates to cathode ray oscillograph circuits and vacuum tube amplifiers used in combination therewith to achieve constancy in the deflection sensitivity of the device. More particularly it relates to a combination of elements including an amplifier circuit and a cathode ray tube and the power supply thereto in which the effects of variations of the sensitivity of the cathode ray tube with changes in the line voltage of the applied power are minimized.

It is common experience in the use of cathode ray oscillographs that the deflection sensitivity of the tube will vary with changes in line voltage. This alteration has been minimized by the incorporation of certain types of voltage regulators in the control circuits of the instruments. Such expedients are effective in accomplishing a reduction in this effect, but they involve complications in the circuit which add materially to the cost of the instrument.

It is accordingly a fundamental object of the instant invention to provide an amplifier circuit for use in combination with a cathode ray oscillograph and power supply subject to variation, whereby the necessity of providing special voltage regulation is eliminated.

It is a further object of the invention to provide a cathode-ray tube amplifier circuit wherein the sensitivity of deflection is related to the gain of the amplifier so that the fluctuations in power supply voltage have no material effect on the deflection sensitivity of the tube.

It is also an object of this invention to provide a deflection amplifier for a cathode-ray oscillograph having substantially constant sensitivity over wide ranges in power line voltage variations.

It is a further object of this invention to provide adjustment for linearity of the output of this amplifier so that the deflection sensitivity of the cathode-ray tube can be kept substantially constant over the entire screen area.

Other objects and advantages of the invention will in part be obvious and in part appear hereinafter.

The invention accordingly is embodied in a cathode-ray tube amplifier circuit in combination with a cathode-ray tube wherein they are connected to the power supply and have deflection signals applied thereto so that alterations in the power supply which change the deflection sensitivity of the tube also alter the gain of the amplifier to work a mutual correction. These deflection signals may be derived from preliminary stages of the type described in my copending application Serial No. 186,475 entitled "Circuit for Cathode Ray Oscillograph," filed concurrently herewith and assigned to the same assignee as the present application.

Briefly, the invention is embodied in the final stage of amplification applied to a cathode ray tube circuit and in its preferred form employs a substantially constant sensitivity, balanced, push-pull D. C. amplifier, which is used as the vertical deflection amplifier in a cathode ray oscillograph, the amplifier being so connected to the power supply that an increase in supply voltage works an increase in the gain of the amplifier to overcome the corresponding decrease in deflection sensitivity of the cathode ray tube produced by the increase in the accelerating voltage applied to the tube. In this particular embodiment of the circuit the last stage of amplification is made in push-pull form employing a pair of matched pentodes, the screen grids of which are operated from the unregulated power supply through a series resistance to alter the sensitivity of the amplifier with changes in line voltage. Since the power line voltage is applied to the electron gun generating the electron beam in the cathode ray tube, this change in gain of the amplifier compensates for the reduction in cathode ray tube sensitivity which is experienced at the higher accelerating potential resulting from the higher line voltages. In the ideal case embodying the invention these compensating factors work in opposition to keep the sensitivity of the system substantially independent of line voltage variations.

In the drawing, the figure constitutes a diagrammatic representation of a preferred embodiment of the invention wherein various portions of the circuit not essential to the detailed exposition of the invention appear in conventionalized block form and the connections to the amplifier and cathode ray tube are set forth in standard wiring diagram symbols.

For understanding the operation of the instrument the circuit is best traced from the conventional power line 10 which is shown connected to the high voltage supply 11 of the cathode ray tube 12. It will be seen that the high voltage supply is applied directly to the conventionalized electron gun 13 in the cathode ray tube and is the source of heating current for the cathode and the source of voltage for generating the high accelerating potential applied to the electron beam.

Branch power line 14 is connected to the low voltage supply 15, one side of which is grounded at 16, and the other side 17 supplies the voltage needed for the operation of various portions of the circuit. The deflection device 18 of the cathode ray tube is connected to the last stage of amplification of the deflection signal circuit. Specifically, tubes 19 and 20 which, in the preferred embodiment of the invention are matched multi-grid tubes connected in a push-pull amplifier circuit, apply the deflection signal to the cathode ray tube deflection device 18. In this push-pull amplifier stage, line 21 supplies, through plate load resistor 22, voltage to the plate 23 of the first tube 20. The suppressor grid 24 is connected to the cathode 25 which in turn is connected by line 26 through resistor 27 to a low voltage supply.

Similar connections take high voltage from the source 15 through line 30, load resistor 31 to the plate 32 of the tube 19. The suppressor grid 33 is connected to the cathode 34 thereof which in turn is connected through line 35 to the same resistor 27 to which the cathode 25 of tube 20 is connected.

Also from the low voltage power supply, line 17 leads through variable resistor 40, fixed resistor 41 to the screen grids 42 and 43 of the two tubes 19 and 20.

For application of deflection signals to the cathode ray tube it will be seen that signals originating at source 50 go through preliminary amplifier stages 51 and are applied directly from the last stages of preliminary amplification to the control grids 52 and 53 of the final amplification stage 19, 20.

In operation this device which combines the final signal amplifier stage and deflection signal applying stage with the cathode ray tube and the several voltage supplies is effective in causing the amplification gain to vary inversely with the cathode ray tube deflection sensitivity. That is, a surge of line voltage at 10 will apply through the high voltage power supply 11 an extra surge of voltage to the electron gun 13 and its associated accelerating electrodes, with the result that the cathode ray beam will lose a certain amount of deflection sensitivity in the conventional type of circuit. However, where, as in the instant case, the power supply 15 is fed from the line 10 and controls the signal application through the push-pull stage of amplification shown, by applying a corresponding surge of voltage to the screen grids of the two amplifier tubes thereby improving their gain, a counteracting effect accompanies the decrease of deflection sensitivity of the cathode ray beam. With the appropriate selection of tubes and associated circuits it is possible to make these two effects substantially neutralize each other, so that a cathode ray oscillograph having a constant deflection sensitivity is obtained.

The variable resistor 40 in the circuit of the screen grids of tubes 19 and 20 also serves as a simplified linearity adjustment for the amplifier to assure that the trace of the cathode ray beam varies linearly with the signal output from the signal source 50. In this way, by proper adjustment the deflection sensitivity of the instrument is maintained substantially constant over the entire cathode ray tube screen area.

Although the invention has been described with only a single embodiment, it will be understood that variations of the circuit thereof embodying the principle of relating amplifier gain in the last stage of amplification to the deflection sensitivity of cathode ray tube may be carried out within the spirit and scope of the invention.

What is claimed is:

A cathode ray tube circuit substantially immune to variations in voltage of the power line, comprising a cathode ray tube having means for producing an electron beam and deflecting means, a substantially unregulated high voltage power supply coupled to said power line for producing high voltage, said high voltage power supply being coupled to said beam-producing means for energization thereof, whereby upon fluctuation of the voltage of said power line the deflection sensitivity of said cathode ray tube is varied, amplifier means coupled to said deflecting means for supplying a deflecting signal thereto, said amplifying means including a final stage of amplification having a pair of screen grid tubes connected in push-pull with their outputs coupled to said deflecting means, a substantially unregulated low voltage power supply also coupled to said power line to be excited therefrom for producing low voltage, said low voltage power supply being coupled to the anodes of said screen grid tubes for excitation thereof by said low voltage, and means for compensating said cathode ray tube for said variations of deflection sensitivity, said last means comprising a direct connection between the screen grids of said tubes, and an adjustable resistor connected between said connected screen grids and said low voltage power supply, whereby upon fluctuation in voltage of said power line, the gain of said screen grid tubes will vary to vary the output of said final stage to vary the excitation of said deflecting means in a sense to compensate for the change in deflection sensitivity of said tube caused by variation in output of said high voltage power supply as a consequence of said power line fluctuation.

MEYER MARON.

REFERENCES CITED

The following references are of record in the file of this patent:

UNITED STATES PATENTS

| Number | Name | Date |
|---|---|---|
| 2,440,538 | Chalberg | Apr. 27, 1948 |
| 2,466,924 | Bradford et al. | Apr. 12, 1949 |